(12) United States Patent
Schuller et al.

(10) Patent No.: US 9,109,705 B2
(45) Date of Patent: Aug. 18, 2015

(54) SEALING RING, IN PARTICULAR FOR A HYDRAULIC PISTON PUMP

(75) Inventors: Wolfgang Schuller, Cleebronn (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 525 days.

(21) Appl. No.: 13/511,435

(22) PCT Filed: Sep. 24, 2010

(86) PCT No.: PCT/EP2010/064129
§ 371 (c)(1),
(2), (4) Date: May 23, 2012

(87) PCT Pub. No.: WO2011/060984
PCT Pub. Date: May 26, 2011

(65) Prior Publication Data
US 2012/0279388 A1 Nov. 8, 2012

(30) Foreign Application Priority Data
Nov. 23, 2009 (DE) .......................... 10 2009 046 975

(51) Int. Cl.
*F16J 15/32* (2006.01)

(52) U.S. Cl.
CPC ............ *F16J 15/324* (2013.01); *F16J 15/3204* (2013.01); *Y10T 29/49236* (2015.01)

(58) Field of Classification Search
CPC .............. F16J 15/56; F16J 15/32; F16F 9/36; F16F 9/365
USPC .................................. 92/165 R, 168; 277/560
See application file for complete search history.

(56) References Cited

U.S. PATENT DOCUMENTS

| | | | | |
|---|---|---|---|---|
| 2,783,068 | A | * | 2/1957 | Cornish et al. ................ 277/582 |
| 3,214,182 | A | * | 10/1965 | Herbruggen .................. 277/465 |
| 3,850,483 | A | * | 11/1974 | Roberts et al. .................. 92/168 |
| 4,909,520 | A | * | 3/1990 | Gallagher ....................... 92/102 |
| 4,944,498 | A | * | 7/1990 | Kortgen et al. .................. 92/168 |
| 4,964,647 | A | * | 10/1990 | Stephan ........................ 277/560 |
| 5,649,711 | A | * | 7/1997 | Jordan .......................... 277/560 |
| 6,695,317 | B2 | * | 2/2004 | Lehnert et al. ................ 277/436 |

FOREIGN PATENT DOCUMENTS

| | | |
|---|---|---|
| DE | 36 06 886 A1 | 9/1987 |
| DE | 3606886 A * | 9/1987 |
| DE | 198 14 145 A1 | 10/1998 |
| DE | 19814145 A1 * | 10/1998 |
| DE | 10 2006 036 442 A1 | 2/2008 |

(Continued)

OTHER PUBLICATIONS

International Search Report corresponding to PCT Application No. PCT/EP2010/064129, mailed Jan. 19, 2011 (German and English language document) (7 pages).

*Primary Examiner* — Thomas E Lazo
(74) *Attorney, Agent, or Firm* — Maginot, Moore & Beck LLP (57) ABSTRACT

A sealing ring, in particular for a hydraulic piston pump, for sealing a pressure chamber which is filled with a fluid is disclosed. A sealing lip having a contour contacts a sealing surface and is movable relative thereto. The contour of the sealing lip is adapted according to the speed of the sealing lip relative to the sealing surface, such that a defined leakage of the fluid out of the pressure chamber is adjusted.

11 Claims, 4 Drawing Sheets

(56) References Cited

FOREIGN PATENT DOCUMENTS

| | | | |
|---|---|---|---|
| EP | 1 544 521 A1 | | 6/2005 |
| EP | 1544521 A1 | * | 6/2005 |
| JP | 01-132860 U | | 9/1989 |
| JP | 02-97772 A | | 4/1990 |
| JP | 2000-54966 A | | 2/2000 |
| JP | 2001-349438 A | | 12/2001 |
| JP | 2007-198478 A | | 8/2007 |
| WO | 2006/123588 A1 | | 11/2006 |
| WO | 2010015439 A1 | | 2/2010 |

\* cited by examiner

SEALING RING, IN PARTICULAR FOR A HYDRAULIC PISTON PUMP

This application is a 35 U.S.C. §371 National Stage Application of PCT/EP2010/064129, filed on Sep. 24, 2010, which claims the benefit of priority to Serial No. DE 10 2009 046 975.3, filed on Nov. 23, 2009 in Germany, the disclosures of which are incorporated herein by reference in their entirety.

BACKGROUND

The disclosure relates to a sealing ring in particular for a hydraulic piston pump, for sealing off a pressure space which is filled with a fluid and in which a sealing lip bears with a contour against a sealing surface and is movable in relation to the latter. The disclosure relates, furthermore, to the use of a sealing ring, to a method for producing a piston pump, to a piston pump and to a vehicle brake system.

Sealing rings for hydraulic piston pumps for sealing off a pressure space filled with a hydraulic fluid usually have an essentially smooth surface which bears against a piston retractable and extendable in a cylindrical space. In this case, friction occurs between the surface of the sealing ring and the piston, thus leading to wear of the sealing ring.

A sealing and guidance arrangement for sealing off on a piston of a pump is known from DE 10 2006 036 442 A1. The sealing and guidance arrangement comprises a guide ring, a supporting ring and a sealing element, the supporting ring being arranged between the sealing element and the guide ring. A contact surface of the guide ring with the supporting ring has at least one region which lies outside a plane perpendicular to a longitudinal axis of the piston, the region being arranged at an inclination to the plane.

This sealing and guidance arrangement provides good leaktightness, together with a long service life of the seal, since, when the pump is in operation, the sealing element presses against the region not lying in the plane, so that a radially inwardly directed force is exerted upon the supporting ring. This prevents a situation where the sealing element is pressed into a region between the supporting ring and the piston, which may lead to damage to the sealing element and to leakage.

The object of the disclosure is to make available a sealing ring which has low symptoms of wear. Furthermore, the sealing ring should allow no leakage or a defined leakage of fluid.

SUMMARY

According to the disclosure, a sealing ring, in particular for a hydraulic piston pump, for sealing off a pressure space filled with a fluid is provided, in which a sealing lip bears with a contour against a sealing surface and is movable in relation to the latter, and in which the contour of the sealing lip is adapted to the speed of the sealing lip in relation to the sealing surface, so that a defined leakage of the fluid out of the pressure space is set.

The hydraulic piston pump advantageously comprises a cylindrical space, which is delimited by a cylindrical wall, and a piston retractable into and extendable out of the cylindrical space. Between the cylindrical wall and the piston is arranged a sealing ring according to the disclosure which seals off a pressure space filled with fluid. When the piston is extended out of the cylindrical space, the piston sucks fluid into the pressure space, and when the piston is retracted it forces the fluid from the pressure space into a hydraulic system for the purpose of performing work.

A fluid is to be understood in the present context to mean a gas or else a hydraulic fluid, such as, for example, a hydraulic fluid based on mineral oil or glycol.

The sealing ring according to the disclosure comprises a sealing lip with a defined contour. To seal off the pressure space, the sealing lip bears with the defined contour against a sealing surface, to be precise either against an outer surface area of the piston or against an inner surface area of the cylindrical wall. When the piston is retracted into and extended out of the cylindrical space, the sealing lip and the sealing surface move in relation to one another.

According to the disclosure, the contour of the sealing lip is adapted to the speed of the sealing lip in relation to the sealing surface in such a way that a defined leakage of the fluid out of the pressure space is set.

This leakage, on the one hand, can be set in such a way that it makes available a defined lubricating film on the sealing surface, so that the sealing surface slides with relatively low friction past the sealing lip, without significant wear of the sealing lip occurring. On the other hand, the leakage can be set so low or recirculation of the fluid from the sealing surface into the pressure space can be set such that no appreciable leakage loss which could lead to the functional impairment of adjacent components occurs.

In particular, the contour of the sealing lip can be adapted to a speed at which the retraction speed of the piston is different from the extension speed of the piston.

A specific ratio of the retraction speed of the piston to its extension speed can be set via an asymmetry of an eccentric driving the piston. A ratio at which the retraction speed is higher than the extension speed is set when no leakage or only slight leakage or recirculation of the fluid is desired. A ratio at which the retraction speed is lower than the extension speed is set, by contrast, when higher leakage, for example to form a lubricating film, is desired. The contour of the sealing lip is adapted for each ratio of the retraction speed to the extension speed in such a way that a defined leakage is made available.

According to a first advantageous development of the sealing ring according to the disclosure, the contour has at least one limb.

In a development of this type, the contour preferably has two limbs, one limb being arranged on a side facing the pressure space and the other limb being arranged on a side facing away from the pressure space. The limbs form an angle with the sealing surface. It has proved advantageous if the limb on the side facing the pressure space forms a larger angle with the sealing surface than the limb on the side facing away from the pressure space.

According to a second advantageous development of the sealing ring according to the disclosure, a limb on a side facing the pressure space forms an angle of 55° to 80° with the sealing surface.

An angle of 55° to 80° has proved advantageous. With a relatively large angle on the side facing the pressure space, long functioning capacity and leaktightness of the sealing lip can be made available.

According to a third advantageous development of the sealing ring according to the disclosure, a limb on a side facing away from the pressure space forms an angle of 10° to 25° with the sealing surface.

A development of this type makes available on the side facing away from the pressure space a contour which does not vary significantly even after a relatively long period of use of the sealing lip and which therefore ensures an essentially uniformly defined leakage or recirculation of fluid.

According to a fourth advantageous development of the sealing ring according to the disclosure, the contour has a first curved portion with a radius of curvature of 0.02 mm to 0.5 mm, a second portion of 0.01 mm to 1 mm running essentially parallel to the sealing surface, and a third curved portion with a radius of curvature of 0.07 mm to 0.5 mm.

This contour is arranged between two limbs and forms a bearing surface which is pressed onto the sealing surface. When a piston pump is in operation, the highest pressure force is exerted upon this bearing surface.

By means of this development, a contour is provided which, in particular, is adapted to a speed of the sealing lip in relation to the sealing surface at which the retraction speed is equal to the extension speed. Such a contour makes available high leaktightness or low leakage, together with a long running performance of the sealing lip.

The second portion of 0.01 mm to 1 mm, running essentially parallel to the sealing surface, enables what is known as independent regeneration of the sealing lip to take place in the event that the sealing lip is damaged by any foreign particles in the fluid.

The third curved portion may also have a radius of curvature of more than 0.5 mm. However, the running performance of the sealing ring falls in such a case by the amount of the running performance which a curved portion with a smaller radius of curvature would additionally make available.

Furthermore, it is conceivable that the contour has at least one curved portion with a radius of curvature of 0.03 mm to 0.5 mm which connects the limb on the side facing the pressure space and the limb on the side facing away from the pressure space.

According to a fifth advantageous development of the sealing ring according to the disclosure, the contour is configured in such a way that it forms a radius of 0.08 mm to 0.12 mm.

A radius is to be understood in the present context to mean a region which extends between two limbs, to be precise between a limb on the side facing the pressure space and a limb on the side facing away from the pressure space.

In a development of this type, a sealing ring is made available which, in particular, can be used in hydraulic piston pumps requiring a long running performance or service life of the sealing lip. An essentially uniformly low leakage of the fluid out in the pressure space is ensured in the present instance.

Furthermore, a use of a sealing ring according to the disclosure in a hydraulic piston pump for generating a defined lubricating film is provided.

The contour of the sealing lip of the sealing ring is adapted to the speed of the sealing lip in relation to the sealing surface, so that a defined leakage of the fluid out of the pressure space is set. To generate a leakage which forms a defined lubricating film on the sealing surface, the retraction speed of the piston is lower than its extension speed. In the present instance, the retraction speed may be lower by the factor three than the extension speed. In such a case, the contour of the sealing lip is configured in such a way that it forms a portion with a length of 0.01 mm or what is known as a radius of 0.01 mm between a limb on the side facing the pressure space and a limb on the side facing away from the pressure space.

Furthermore, the retraction speed of the piston may be lower by the factor six than its extension speed. In this case, the contour of the sealing lip is configured in such a way that it forms a portion with a length of 0.1 mm or what is known as a radius of 0.1 mm between a limb on the side facing the pressure space and a limb on the side facing away from the pressure space.

Using the sealing ring according to the disclosure in a hydraulic piston pump, a lubricating film can be provided between the sealing lip and the sealing surface and ensures that the sealing lip moves back and forth in relation to the sealing surface with relatively low friction. The wear of the sealing lip is low, and therefore the sealing ring has a long service life. At the same time, the leakage of the fluid out of the pressure space is so low that functional impairments of adjacent components are avoided.

The sealing ring according to the disclosure can be used in all seals which are subjected to oscillating stress and the sealing action of which is implemented via a sealing lip. The use of such a sealing ring proves to be especially advantageous when leaktightness and/or running performance must satisfy stringent requirements.

Furthermore, the use of a sealing ring according to the disclosure proves advantageous when the sealing ring bears very closely against the piston, in particular when there is what is known as overpressing in the range of 5 to 20%.

Moreover, a method for producing a hydraulic piston pump is provided. The method comprises the following steps:
  production and provision of a sealing ring,
  provision of a piston and of a cylindrical space which is delimited by a cylindrical wall,
  insertion of the piston into the cylindrical space, so that the piston can be retracted and extended in the cylindrical space,
  introduction of the sealing ring between the piston and the cylindrical wall, so that a sealing lip of the sealing ring bears with a defined contour against a sealing surface and can be moved in relation to the latter, so that a pressure space filled with a fluid is sealed off.

According to the disclosure, when the sealing ring is being produced, the contour is adapted such that a specific lubricating film thickness of fluid is formed between the sealing lip and the sealing surface at a retraction speed of the piston which is lower than the extension speed.

One advantage of this method is that the lubricating film thickness is sufficiently large to ensure that the sealing lip and the sealing surface can slide past one another relatively frictionlessly. Wear of the sealing lip is thus minimized and the service life is optimized. Furthermore, the leakage of the fluid emerging from the pressure space when the hydraulic reciprocating piston pump is in use is so low that no functional impairments to adjacent components occur.

Furthermore, a piston pump having a sealing ring according to the disclosure is provided.

The piston pump according to the disclosure comprises a cylindrical space which is delimited by a cylindrical wall. A piston is arranged retractably and extendably in the cylindrical space. A sealing ring with a sealing lip and with a defined contour is arranged between the piston and the cylindrical wall and seals off according to the features referred to above a pressure space filled with a fluid.

Moreover, a vehicle brake system with a piston pump having a sealing ring according to the disclosure is provided.

A vehicle brake system of this type may be, for example, a brake system with a hydraulic brake modulation unit, an antilock system (ABS) or else an electronic stabilization program (ESP). In such brake systems, it is advantageous, in particular, if the leakage of a piston pump has a defined value or a defined lubricating film is applied to the sealing surface, in order to make available optimal functioning of the brake system together with a long running performance. Moreover, leakage in vehicle brake systems should not have too high a value so that functional impairments to adjacent components are prevented.

BRIEF DESCRIPTION OF THE DRAWINGS

Exemplary embodiments of the solution according to the disclosure are explained in more detail below by means of the accompanying diagrammatic drawings in which.

DETAILED DESCRIPTION

Figure 1:
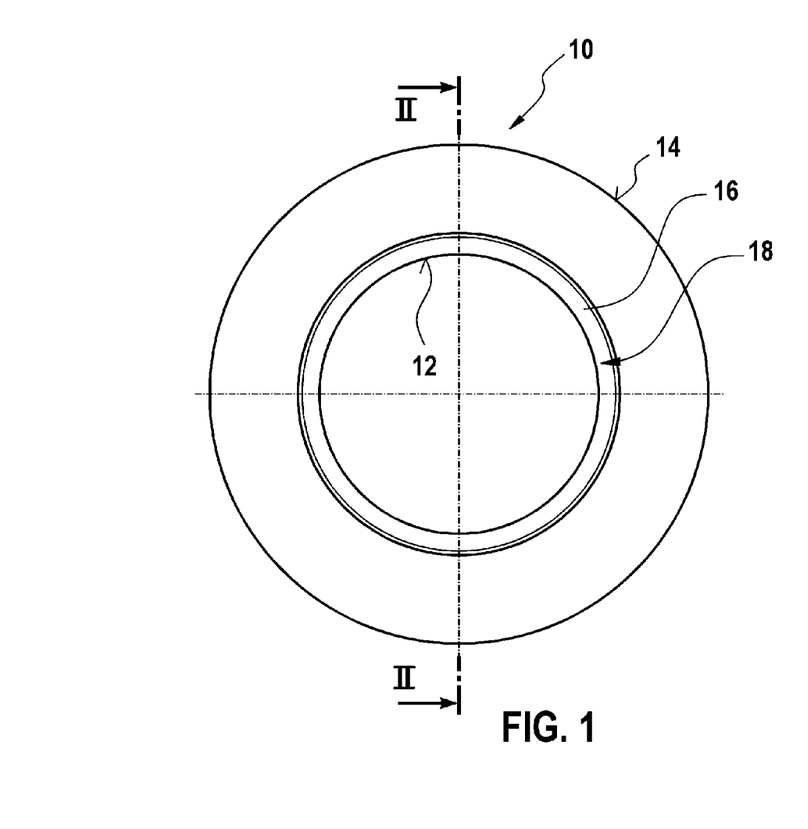
FIG. 1 shows a top view of a sealing ring according to the disclosure.

FIG. 1 shows a sealing ring 10 according to the disclosure with an inner surface area 12 and with an outer surface area 14. The sealing ring 10 has at the inner surface area 12 a sealing lip 16 with a defined contour 18 (cf. FIG. 2).

Figure 2:
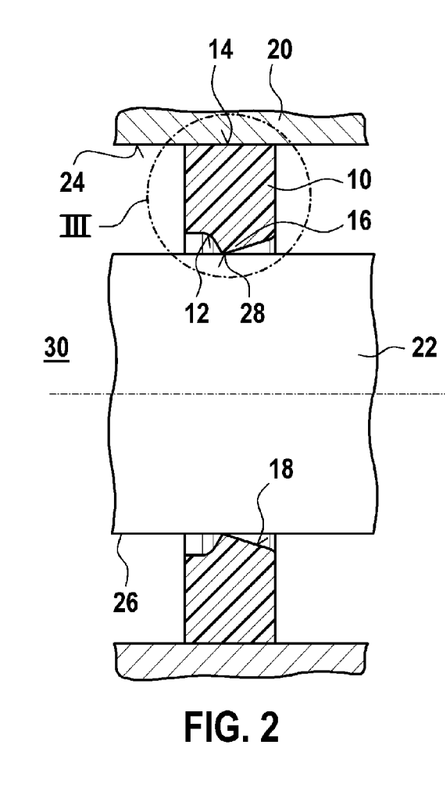
FIG. 2 shows the cross section II-II according to FIG. 1.

FIG. 2 shows the sealing ring 10 which is arranged between a cylindrical wall 20 of a cylindrical space and a piston 22 of a hydraulic piston pump. The sealing ring 10 bears with its outer surface area 14 against an inner surface area 24 of the cylindrical wall 20 and with the defined contour 18 of the sealing lip 16 against an outer surface area 26 of the piston 22. The piston 22 is configured so as to be retractable and extendable within the cylindrical space and at a surface of contact between the sealing lip 16 and its outer surface area 26 forms a sealing surface 28 which is movable in relation to the sealing lip 16 of the sealing ring 10. In the present instance, the sealing ring 10 seals off a pressure space 30 filled with a fluid.

The contour 18 of the sealing lip 16 is in the present instance adapted to the speed of the sealing lip 16 in relation to the sealing surface 28, so that a defined leakage of the fluid out of the pressure space 30 is set.

Figure 3:
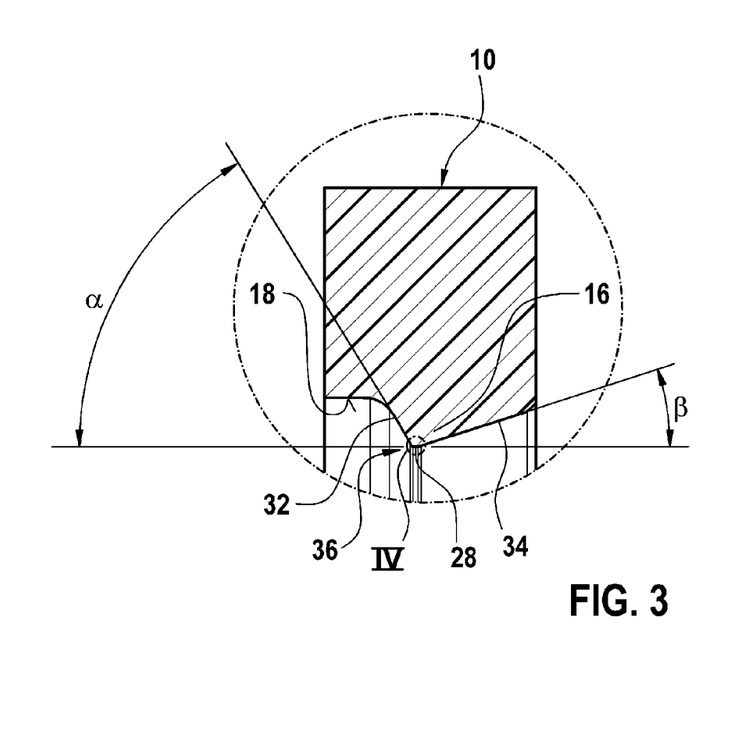
FIG. 3 shows the enlarged detail III in FIG. 2.

FIG. 3 illustrates the contour 18 of the sealing lip 16. The contour 18 comprises two limbs 32, 34, one of the limbs 32 being arranged on a side facing the pressure space 30 and the other limb 34 being arranged on a side facing away from the pressure space 30. The two limbs 32, 34 form a region 36 at a vertex where they meet. This region 36 forms the surface of contact between the sealing lip 16 and the outer surface area 26 of the piston 22 or defines the sealing surface 28. In the present instance, the limb 32 on the side facing the pressure space 30 forms an angle α of approximately 55° to approximately 80° with the sealing surface 28. The limb 34 on the side facing away from the pressure space 30 forms, by contrast, an angle β of approximately 10° to approximately 25° with the sealing surface 28.

In the present instance, the sealing ring 10 is provided with a visible feature to distinguish the limbs 32, 34 or the angles α, β in a simplified way. This visible feature may be a specific color, a specific surface quality or else lettering.

The overall width of the sealing ring 10 amounts to 0.1 to 3 times the piston stroke.

The contour 18 according to the disclosure of the sealing lip 16 may be implemented when the sealing ring 10 is in a new state or may be set only as a result of the action of forces caused by adjacent components.

Figure 4:
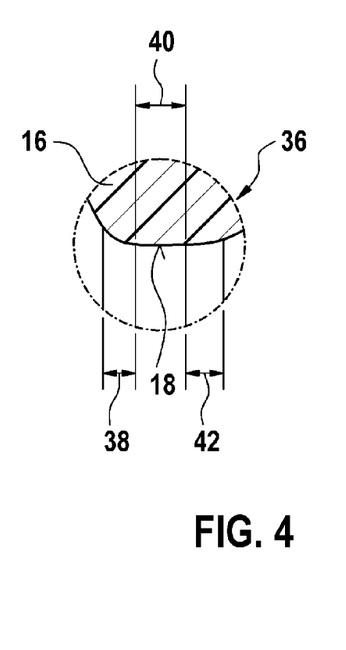
FIG. 4 shows the enlarged detail IV in FIG. 3.

The region 36 is illustrated in FIG. 4. The contour 18 of the sealing lip 16 has in succession from left to right in this region 36 a first portion 38, a second portion 40 and a third portion 42. In the present instance, the first portion 38 is curved convexly with regard to the sealing surface 28, with a radius of curvature of approximately 0.02 mm to 0.5 mm, the second portion 40 runs essentially parallel to the sealing surface 28 and has a length of approximately 0.01 mm to approximately 1 mm, and the third portion 42 is curved convexly with regard to the sealing surface 28 with a radius of curvature of approximately 0.07 mm to 0.5 mm.

This contour 18 of the sealing lip 16 is adapted for the operating situation where the retraction speed of the piston 22 is equal to the extension speed and ensures at the sealing surface 28 high leaktightness over a long running performance of the sealing ring 10 without significant leakage during the retraction of the piston 22 into the cylindrical space. The second portion 40, which runs essentially parallel to the sealing surface 28, enables what is known as regeneration of the sealing lip 16 to take place when the contour 18 is damaged by any foreign particles in this portion 40.

The sealing ring 10 is used in piston pumps for vehicle brake systems, such as brake systems with a hydraulic brake modulation unit, ABS or ESP systems.

Figure 5:
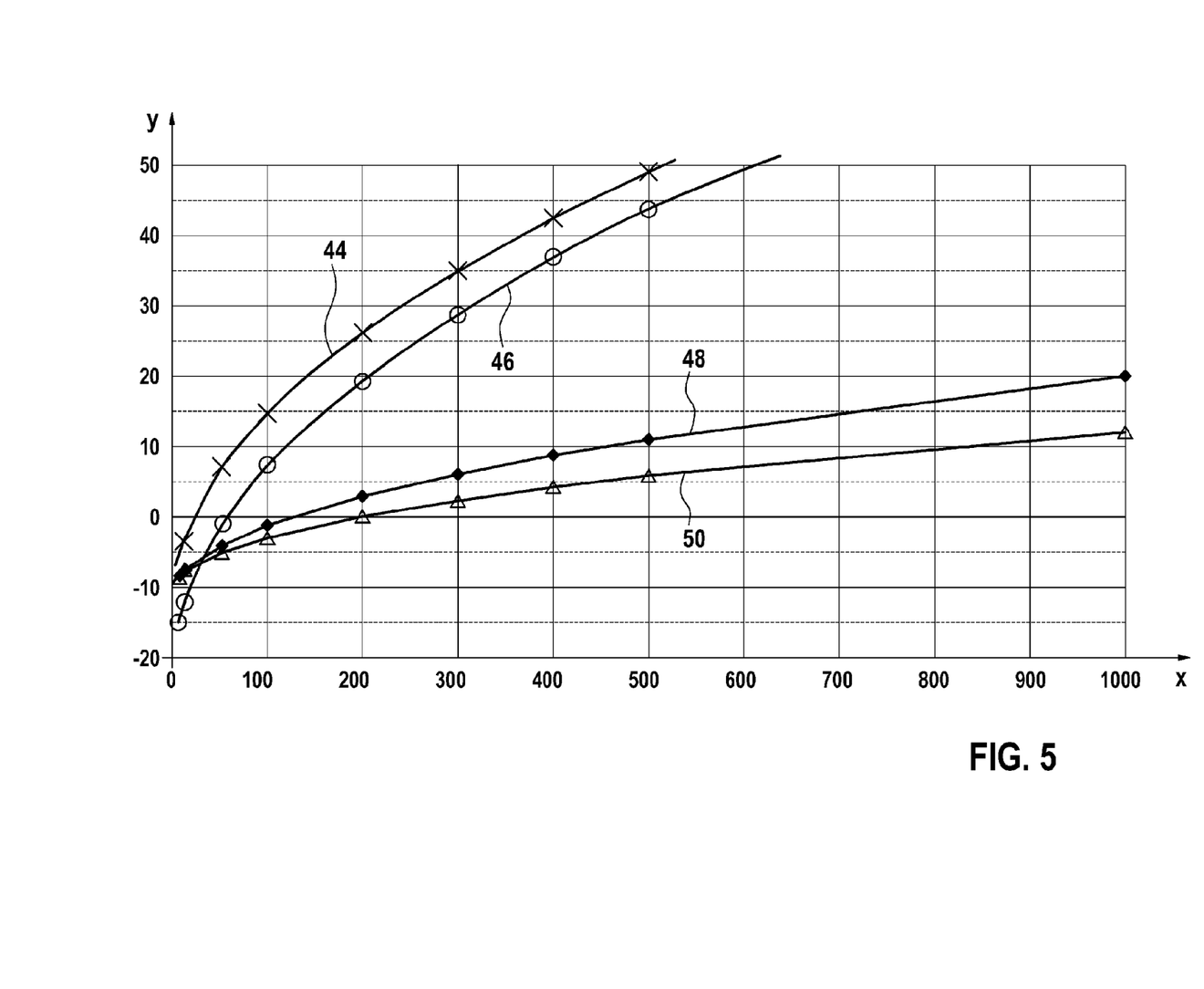
FIG. 5 shows a graph which illustrates a lubricating film thickness difference under a change in the retraction speed in the case of a constant extension speed.

FIG. 5 shows a graph with two axes, a lubricating film thickness difference being plotted on the vertical y-axis in nm and a retraction speed of the piston 22 into the cylindrical space being plotted in mm/s, on the horizontal x-axis.

A lubricating film thickness difference is to be understood to mean the thickness of the lubricating film which, when the piston 22 is retracted into the cylindrical space, is not wiped off on the side lying opposite the pressure space 30, but instead is recirculated into the pressure space 30. The lubricating film thickness difference is therefore the difference between the lubricating film expelled and the leakage and is therefore a measure of the recirculation of fluid between the retracting action and extending action of the piston 22.

The graph according to FIG. 5 reproduces for four sealing lips 10 with different contours 18 the associated lubricating film thickness difference in the event of a change in the retraction speed of the piston 22. In this case, the extension speed of the piston 22 is always equal to 300 nm/s, and there is a differential pressure of 20 MPa between the pressure space 30 and the side facing away from the pressure space 30.

A curve 44 refers to a sealing lip 16 with two limbs 32, 34 which form different angles α, β with the sealing surface 28. The angle α between the limb 32 which is arranged on the side facing the pressure space 30 and the sealing surface 28 amounts in the present instance to approximately 55° to 80°. The angle β between the limb 34 which is arranged on the side facing away from the pressure space 30 and the sealing surface 28 amounts, by contrast, to approximately 10° to 25°.

A curve 46 refers to the sealing lip 16 according to curve 44, the sealing lip 16 having experienced a driving performance of approximately 810 km. After a driving performance of approximately 810 km, the sealing lip 16 has wear such that the radius, as it is known, that is to say the portion between the limb 32 on the side facing the pressure space 30 and the limb 34 on the side facing away from the pressure space 30 amounts to 0.1 mm.

A curve 48 refers to the sealing lip 16 according to curve 44, the sealing lip 16 having experienced a driving performance of approximately 300 km. After a driving performance of approximately 300 km, the sealing lip 16 has wear such that the radius, as it is known, that is to say the portion between the limb 32 on the side facing the pressure space 30 and the limb 34 on the side facing away from the pressure space 30, amounts to 0.01 mm.

A curve 50 refers to the sealing lip 16 according to curve 44, the sealing lip 16 having experienced a driving performance of approximately 200 km. After a driving performance of approximately 200 km, the sealing lip 16 has wear such that the radius, as it is known, that is to say the portion between the limb 32 on the side facing the pressure space 30 and the limb 34 on the side facing away from the pressure space 30, amounts to 0.003 mm.

Figure 6:
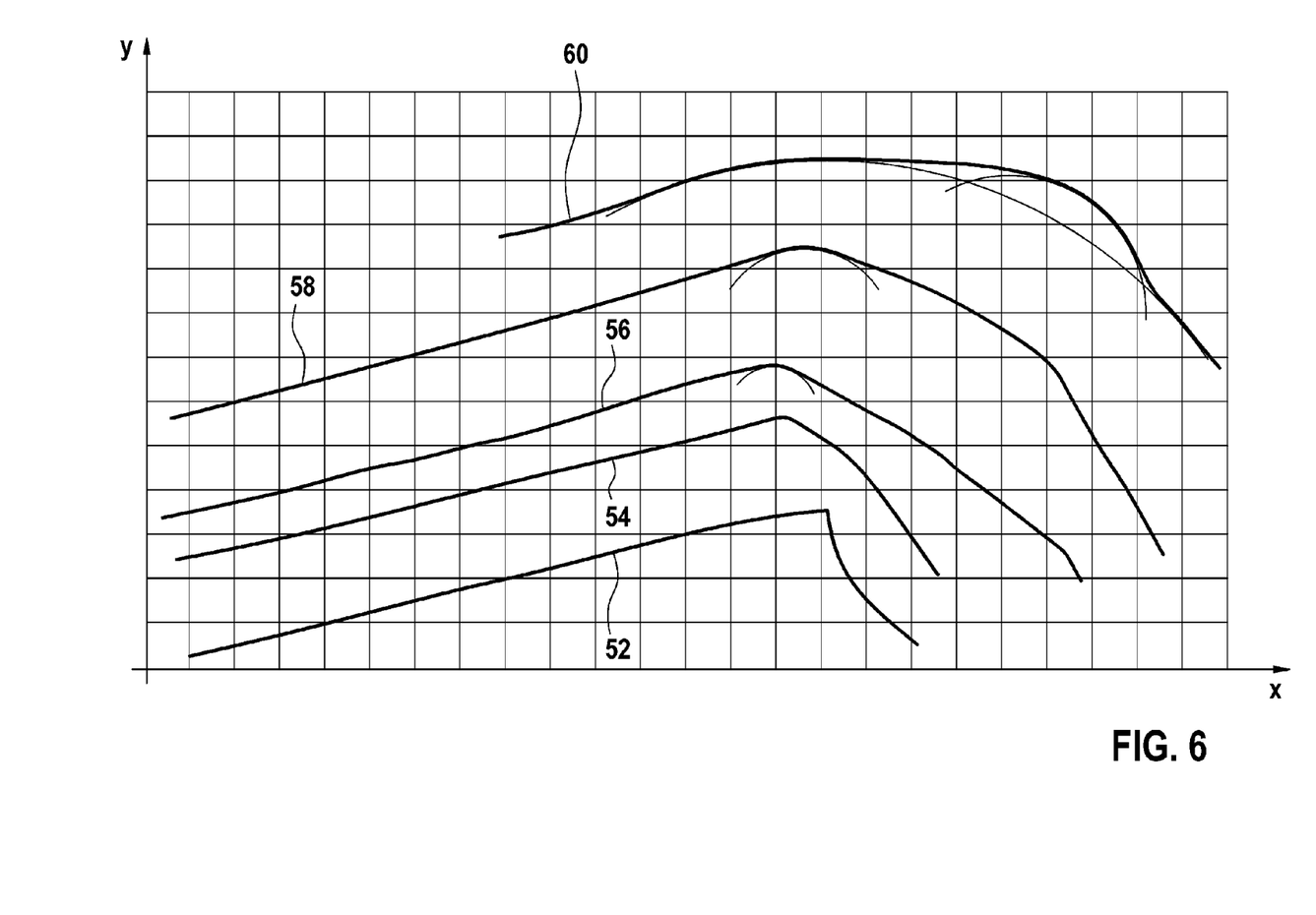
FIG. 6 shows a graph which illustrates the wear of the sealing lip under a change in the running performance.

FIG. 6 illustrates a graph which reproduces the variation in the contour 18 of the sealing lip 16 according to FIG. 5 over the various driving performances. The radius, as it is known, that is to say the portion between the limb 32 on the side facing the pressure space 30 and the limb 34 on the side facing away from the pressure space 30, is plotted on the vertical y-axis, and the contour 18 is plotted diagrammatically over its length profile in the horizontal x-axis.

A curve 52 illustrates the contour 18 in the new state according to the curve 44 in FIG. 5. A curve 54 illustrates the contour 18 after a running performance of 200 km according to curve 50 in FIG. 5. A curve 56 illustrates the contour 18 after a running performance of 300 km according to curve 48 in FIG. 5. A curve 58 illustrates the contour 18 after a running performance of 400 km and the curve 60 the contour 18 after a running performance of 810 km according to curve 46 in FIG. 5.

According to curve 44 in FIG. 5, at a retraction speed which is equal to the extension speed of the piston 22, to be precise at 300 mm/s, a positive lubricating film thickness difference, that is to say a recirculation of fluid, in an amount of 35 nm is set.

After a running performance of the sealing lip 18 of 300 km (cf. curve 56 in FIG. 6), the contour 18 of the sealing lip undergoes wear to a radius, as it is known, of approximately 0.01 mm. The lubricating film thickness difference consequently falls to approximately 6 nm, that is to say, in the case of such wear, there is only 1/7 of the original recirculation of fluid (cf. curve 48 in FIG. 5).

In the case of a running performance of the sealing ring 10 of approximately 800 km, the radius, as it is known, increases to 0.1 mm or, as a result of wear, an approximately 0.02 to 1 mm long portion 40 is formed parallel to the sealing surface 28 (cf. curve 60 in FIG. 6). In this case, the lubricating film thickness difference surprisingly rises again to a value in an amount of 30 nm, that is to say to approximately 6/7 of the original value (cf. curve 46 in FIG. 5).

The initial effect whereby the lubricating film thickness difference first decreases in the case of a running performance of 300 km is attributable to a change in the angle α which is formed by the limb 32 and the sealing surface 28 on the side facing the pressure space 30. By contrast, the renewed rise in the lubricating film thickness difference to approximately 30 nm after the running performance of approximately 810 km is attributable to the increase in the radius, as it is known, from 0.01 mm to 0.1 mm. This increase in radius ensures higher recirculation of the fluid.

The change in the contour 18 or the wear of the sealing lip 16 occurs essentially at the region 36 at which the limbs 32, 34 meet. In particular, the angle α which is formed by the limb 32 on the sealing surface 28 on the side facing the pressure space 30 changes. The angle β which is formed by the limb 34 and the sealing surface 28 on the side facing away from the pressure space 30 does not change significantly during the wear of the sealing lip 16 (cf. curves 52, 56, 60 in FIG. 6).

Furthermore, the setting of a desired leakage for lubrication purposes, a negative lubricating film thickness difference, is illustrated in FIG. 5. To achieve a defined leakage, the retraction speed of the piston 22 is set lower than the extension speed of the latter. After a retraction speed lower by a factor three than the extension speed, negative lubricating film thickness differences are implemented even in the case of a radius, as it is known, that is to say a portion between the limb 32 on the side facing the pressure space 30 and the limb 34 on the side facing away from the pressure space 30, of approximately 0.01 mm (cf. curve 48). At a retraction speed lower by a factor six than the extension speed, however, negative lubricating film thickness differences are achieved only in the case of a radius, as it is known, that is to say a portion between the limb 32 on the side facing the pressure space 30 and the limb 34 on the side facing away from the pressure space 30, of approximately 0.1 mm (cf. curve 46).

The exemplary values given above are dependent on various parameters, such as a stroke travel of the piston 22 within the cylindrical space, a surface quality of the piston 22, temperature conditions, a type of fluid and materials used, and are influenced by these parameters.

The invention claimed is:

1. A sealing ring for a hydraulic piston pump for sealing off a pressure space which is filled with a fluid, comprising:
   a sealing lip configured with a contour to bear against a sealing surface, the contour defining a first curved portion, an opposite second curved portion, and a parallel portion extending from the first curved portion to the second curved portion, the parallel portion running essentially parallel to the sealing surface, and the sealing lip being movable in relation to the sealing surface,
   wherein the contour of the sealing lip is adapted to the speed of the sealing lip in relation to the sealing surface so that a defined leakage of the fluid out of the pressure space is set.

2. The sealing ring as claimed in claim 1, wherein the contour further defines at least one limb extending from one of the first curved portion and the second curved portion.

3. The sealing ring as claimed in claim 2, wherein the at least one limb is located on a side of the contour facing the pressure space and forms an angle of 55° to 80° with the sealing surface.

4. The sealing ring as claimed in claim 2, wherein the at least one limb is located on a side of the contour facing away from the pressure space and forms an angle of 10° to 25° with the sealing surface.

5. The sealing ring as claimed in claim 1, wherein the first curved portion defines a radius of curvature of 0.02 mm to 0.5 mm, the parallel portion defines a length of 0.01 mm to 1 mm, and the third curved portion defines a radius of curvature of 0.07 mm to 0.5 mm.

6. The sealing ring as claimed in claim 1, wherein the contour is configured so that it forms between two limbs a portion with a length of 0.08 mm to 0.12 mm.

7. The sealing ring as claimed in claim 1, wherein the sealing ring is configured to generate a defined lubricating film.

8. A method for producing a hydraulic piston pump, comprising:
   providing a piston and a cylindrical space which is delimited by a cylindrical wall,
   inserting the piston into the cylindrical space so that the piston is retractable and extendable in the cylindrical space,
   introducing a sealing ring between the piston and the cylindrical wall so that a sealing lip of the sealing ring bears with a contour against a sealing surface and is movable in relation to the sealing surface so that a pressure space filled with a fluid is sealed off, and
   using the contour to form a predetermined lubricating film thickness of fluid between the sealing lip and the sealing surface during a retraction stroke of the piston in response to a retraction speed of the piston being lower than an extension speed of the piston.

9. The method as claimed in claim 8, wherein the contour defines a first curved portion, an opposite second curved portion, and a parallel portion extending from the first curved portion to the second curved portion, the parallel portion running essentially parallel to the sealing surface.

10. A piston pump comprising:
   a sealing ring configured to seal off a pressure space which is filled with a fluid, the sealing ring having a sealing lip configured to bear with a contour against a sealing surface, and the sealing ring being movable in relation to the sealing surface, the contour defining a first curved portion, an opposite second curved portion, and a parallel portion extending from the first curved portion to the second curved portion, the parallel portion running essentially parallel to the sealing surface,
   wherein the contour of the sealing lip is based on the speed of the sealing lip in relation to the sealing surface so that a defined leakage of the fluid out of the pressure space is set.

11. The piston pump as claimed in claim 10, wherein the piston pump is configured to be used in a vehicle brake system.

\* \* \* \* \*